United States Patent [19]

Nishimoto et al.

[11] Patent Number: 4,841,383

[45] Date of Patent: Jun. 20, 1989

[54] CONTROL PULSE RECORDING CIRCUIT FOR MAGNETIC RECORDING AND REPRODUCING APPARATUS

[75] Inventors: Naomichi Nishimoto, Toyko; Takeshi Okauchi, Chigasaki; Koichi Kido, Yokosuka, all of Japan

[73] Assignee: Victor Company of Japan, Ltd., Kanagawa, Japan

[21] Appl. No.: 206,949

[22] Filed: Jun. 9, 1988

Related U.S. Application Data

[63] Continuation of Ser. No. 886,020, Jul. 16, 1986, abandoned.

[30] Foreign Application Priority Data

Jul. 16, 1985 [JP] Japan .................... 60-156679
Jul. 17, 1985 [JP] Japan .................... 60-157905

[51] Int. Cl.$^4$ .................... H04N 5/78; G11B 27/02
[52] U.S. Cl. .................... 360/33.1; 360/14.2; 360/74.4
[58] Field of Search .................... 360/14.2, 33.1, 74.4

[56] References Cited

U.S. PATENT DOCUMENTS 4,482,926 11/1984 Nishijima et al. .................. 360/14.2
4,549,231 10/1985 Namiki ...................... 360/33.1 X R
4,570,192 2/1986 Hori .................................. 360/14.2

FOREIGN PATENT DOCUMENTS

2247078 4/1974 Fed. Rep. of Germany .
3217557 5/1982 Fed. Rep. of Germany .
3309029 3/1983 Fed. Rep. of Germany .

Primary Examiner—Aristotelis M. Psitos
Attorney, Agent, or Firm—Michael N. Meller

[57] ABSTRACT

A control pulse recording circuit for a magnetic recording and reproducing apparatus comprises a control head, a circuit for detecting leading edges of control pulses reproduced by the control head, a circuit for generating a recording voltage having a polarity which changes at a time in accordance with recording data to be recorded in a re-write operation, and a switching circuit for blocking supply of the recording voltage to the control head at a time which is after a predetermined time from a time when the re-writing operation is ended and is immediately before a next leading edge of the control pulses.

6 Claims, 6 Drawing Sheets

CONTROL PULSE RECORDING CIRCUIT FOR MAGNETIC RECORDING AND REPRODUCING APPARATUS

This application is a continuation of application Ser. No. 886,020, filed July 16, 1986, now abandoned.

BACKGROUND OF THE INVENTION

The present invention generally relates to control pulse recording circuits for magnetic recording and reproducing apparatuses, and more particularly to a control pulse recording circuit for re-recording (re-writing) control pulses by varying the duty cycle thereof depending on an arbitrary information while reproducing the square wave control pulses which are pre-recorded on a control track of a magnetic tape with a constant period for the purpose of carrying out a servo operation at the time of a reproduction in a helical scan type magnetic recording and reproducing apparatus.

A helical scan type magnetic recording and reproducing apparatus (hereinafter simply referred to as a video tape recorder or VTR) records and reproduces an information signal on and from a magnetic tape. A control track is formed along the longitudinal direction of the tape, and for example, control pulses having a period of one frame is recorded on the control track of the tape by a control head. Video tracks formed obliquely to the longitudinal direction of the tape are formed in a central portion of the tape, and the information signal such as a video signal is recorded on the video tracks by rotary heads. In addition, an audio track is formed at the upper end of the tape along the longitudinal direction thereof.

A pre-recorded tape is accommodated within a cassette case, for example, and is loaded into a main body of the VTR. During ordinary operation modes (for example, normal reproduction mode and variable-speed reproduction modes other than still picture reproduction mode) of the VTR, the tape is transported in a loaded state where the tape is in such a predetermined tape path that the tape is drawn out of the cassette case and is wrapped obliquely around the outer peripheral surface of a rotary body (for example, a rotary drum) for a predetermined angular range. This rotary body is mounted with the rotary heads. The tape in this predetermined tape path is transported by a capstan and a pinch roller which pinch and drive the tape. As is well known, the control pulses reproduced from the moving tape is used as a reference signal for a phase control system of a head servo circuit which controls the rotational phase of the rotary heads constant or as a comparison signal for a phase control system of a capstan servo circuit which controls the rotational phase of the capstan constant.

The control pulses at the time of the recording have the form of a square wave signal. But due to the differentiating characteristic and the like of the control head, the reproduced control pulses have the form of a positive polarity pulse at the rising edge of the pre-recorded square wave signal (pre-recorded control pulses) and the form of a negative polarity pulse at the falling edge of the pre-recorded square wave signal. Out of the positive and negative polarity pulses of the reproduced control pulses, only the positive polarity pulses are used as the control pulses in each of the servo circuits described above, and the negative polarity pulses are not used in the servo circuits. For this reason, it is possible to record a new information (for example, the title of the recorded information, the recorded date and other data) by varying the duty cycle of the control pulses at the time of the recording as will be described later on in the present specification, and a random access or the like can be performed by reproducing such new information at the time of the reproduction.

In this case, when playing the pre-recorded tape, it is necessary to perform a recording so as to vary the duty cycle of the control pulses while performing a reproduction so that the positive polarity pulses (hereinafter referred to as reference pulses) of the reproduced control pulses are supplied to the servo circuit to ensure a normal servo operation. Therefore, it is necessary to erase an interval between two mutually adjacent reference pulses and also re-record (re-write) the negative polarity pulses of the control pulses. The re-writing is performed by first reproducing the control pulse from the control track of the pre-recorded tape and obtaining a recording voltage. The recording voltage is a positive D.C. voltage from a first position immediately after a certain reference pulse to a second position (this second position changes depending on the duty cycle with which the re-writing is to be performed) immediately before a negative polarity pulse which is immediately after the certain reference pulse, for example. The recording voltage is a negative D.C. voltage from the second position to a third position immediately before the next reference pulse, and is zero from the third position to a position immediately after this next reference pulse. The control head is supplied with the recording voltage and is excited to the same magnetic pole as before in the interval between the first and second positions, excited to the opposite magnetic pole at the second position, and is continuously excited to this opposite magnetic pole to the third position. As a result, the control track is erased in the interval between the first and third positions, and the magnetic polarity is re-written between the second and third positions. The re-writing operation is ended at the third position.

After the re-writing operation is ended, the certain reference pulse is reproduced with the same timing as the original reference pulse with the constant period, and the negative polarity pulse immediately after the certain reference pulse is reproduced with a new timing. In other words, the control pulses are reproduced with the duty cycle thereof varied.

However, in the waveform of the re-written reproduced control pulses, noise is frequently generated at the first position where the re-writing is started and at the third position where the re-writing is ended. Hence, there are problems in that the noise may cause disorder in the synchronism, incorrect count of an absolute address and the like.

On the other hand, the recording voltage at the input of the control head is in the order of several volts, while the reproduced output at the output of the control head is in the order of several millivolts and is extremely small. However, the mode of the VTR is conventionally switched from the recording mode to the reproducing mode immediately after the re-writing operation is ended at the third position. For this reason, the recording voltage is still not converged to zero at the time immediately after the mode is switched to the reproducing mode due to the counter electromotive force or the exciting current at the time of the recording, and there is a problem in that it is difficult to reproduce the reference pulses.

SUMMARY OF THE INVENTION

Accordingly, it is a general object of the present invention to provide a novel and useful control pulse recording circuit for a magnetic recording and reproducing apparatus, in which the problems described heretofore are eliminated.

Another and more specific object of the present invention is to provide a control pulse recording circuit for recording control pulses at the time of the reproduction by supplying to a control head a recording voltage which changes its polarity within an interval between leading edges of two mutually adjacent pre-recorded control pulses with a timing dependent on the duty cycle of a control pulse which is recorded so as to re-write the pre-recorded control pulse, wherein the mode is switched back to the reproducing mode by blocking the supply of the recording voltage to the control head at a time which is after a predetermined time from the end of a re-writing operation performed within the above interval and is immediately before a leading edge of the pre-recorded control pulse. According to the control pulse recording circuit of the present invention, the mode is switched back to the reproducing mode after the predetermined time has elapsed from the end of the re-writing operation. For this reason, the mode is switched back to the reproducing mode after the input of the control head at the end of the re-writing operation converges to approximately zero, and it is possible to easily and positively reproduce the leading edge of the pre-recorded control pulse.

Still another object of the present invention is to provide a control pulse recording circuit which produces a recording voltage having a sloping portion within an interval between leading edges of two mutually adjacent pre-recorded control pulses at a position in a vicinity of a position where a re-writing operation is started and at a position in a vicinity of a position where the re-writing operation is ended, and uses the recording voltage to record control pulses on a magnetic tape by a control head. According to the control pulse recording circuit of the present invention, when playing a magnetic tape having the duty cycle of the pre-recorded control pulses changed depending on an information by performing the re-writing operation, it is possible to considerably reduce noise which is generated at positions where the re-writing should originally not take place such as the positions where the re-writing operation is started and ended. Therefore, it is possible to prevent erroneous operations such as tracking error, incorrect synchronism, incorrect count of an absolute address which would otherwise be caused by the noise.

Other objects and further features of the present invention will be apparent from the following detailed description when read in conjunction with the accompanying drawings.

BRIEF DESCRIPTION OF THE DRAWINGS

FIGS. 2 (A) through 2 (F) are time charts showing the direction of magnetic field on the magnetic tape and signal waveforms obtained by a conventional control pulse recording circuit;

FIGS. 4 (A) through 4 (H) show signal waveforms for explaining the operation of the circuit system shown in FIG. 3;

FIGS. 6 (A) through 6 (E) show signal waveforms for explaining the operation of the circuit shown in FIG. 5;

FIGS. 8 (A) through 8 (J) are time charts showing the direction of magnetic field on the magnetic tape and signal waveforms for explaining the operation of the circuit system shown in FIG. 7.

DETAILED DESCRIPTION

Figure 1:
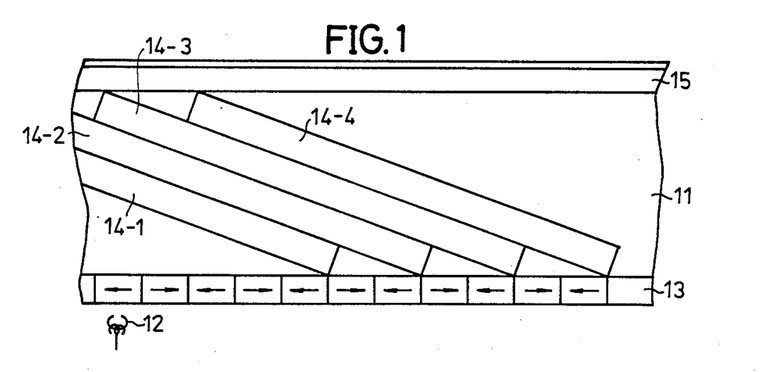
FIG. 1 shows an example of a track pattern formed on a pre-recorded magnetic tape.

The present invention relates to a control pulse recording circuit which re-writes (re-records) pre-recorded control pulses by changing the duty cycle of the pre-recorded control pulses during a reproducing mode in which pre-recorded signals are reproduced from a pre-recorded magnetic tape 11 shown in FIG. 1 which has been recorded on a helical scan type magnetic recording and reproducing apparatus (VTR). In FIG. 1, a control track 13 is formed in the longitudinal direction of the tape 11, and oblique video tracks 14-1 through 14-4 are formed obliquely to the longitudinal direction of the tape 11 in the central portion of the tape 11. An audio track 15 is formed in the longitudinal direction of the tape 11 at the upper end thereof. The control track 13 is pre-recorded with control pulses which have been recorded by a control head 12 and have a period of one frame, for example. The video tracks 14-1 through 14-4 are pre-recorded with an information signal such as a video signal which has been recorded by rotary heads (not shown). In the control track 13 shown in FIG. 1, arrows pointing to the right indicate portions recorded by being excited to the N-pole and arrows pointing to the left indicate portions recorded by being excited to the S-pole.

As described before, in order to vary the duty cycle of the pre-recorded control pulses so as to newly record another information, it is necessary to erase an interval between two mutually adjacent reference pulses (positive polarity pulses) and also re-record (re-write) negative polarity pulses of the control pulses while performing a reproduction so that the reference pulses of the reproduced control pulses are supplied to a servo circuit to ensure a normal servo operation.

Figure 2:
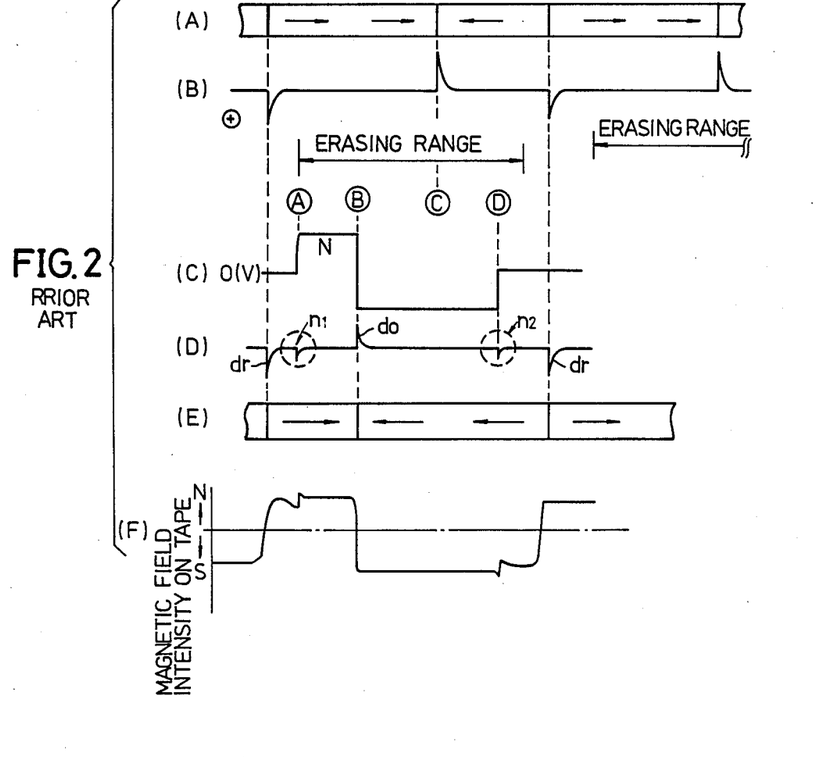

The re-writing operation is performed by first reproducing the control track 13 of the tape 11 so as to obtain reproduced control pulses shown in FIG. 2 (B), and a recording voltage shown in FIG. 2 (C) is thereafter obtained. FIG. 2 (A) schematically shows the polarity of the magnetic field on the control track 13 of the tape 11, where arrows pointing to the right indicate the N-pole and arrows pointing to the left indicate the S-pole. In FIG. 2 (B), the pulses facing downward correspond to the reference pulses.

The recording voltage shown in FIG. 2 (C) is a positive D.C. voltage from a position Ⓐ immediately after a certain reference pulse to a position Ⓑ (this position changes depending on the duty cycle with which the re-writing is to be performed) immediately before a negative polarity pulse which is immediately after the certain reference pulse, for example. The recording voltage is a negative D.C. voltage from the position Ⓑ to a position Ⓓ immediately before the next reference pulse, including a position Ⓒ of the negative polarity pulse immediately after the certain reference pulse. In addition, the recording voltage is zero from the position Ⓓ to a position immediately after this next reference pulse. The control head is supplied with the recording voltage and is excited to the same magnetic pole as before (N-pole in this case) in the interval between the positions Ⓐ and Ⓑ, excited to the opposite magnetic pole (S-pole in this case) at the position Ⓑ, and is continuously excited to this opposite magnetic pole to the position Ⓓ. As a result, the control track is erased in the interval between the positions Ⓐ and Ⓓ, and the magnetic polarity is re-written between the positions Ⓑ and Ⓓ. The re-writing operation is ended at the position Ⓓ.

After the re-writing operation is ended, the direction of the magnetic field becomes as shown schematically in FIG. 2 (E). Furthermore, the magnetic field intensity on the control track becomes as shown in FIG. 2 (F). Hence, the waveform of the reproduced control pulses after the re-writing operation becomes as shown in FIG. 2 (D), and the certain reference pulse $d_r$ is reproduced with the same timing as the original reference pulse with the constant period while the negative polarity pulse $d_o$ immediately after the certain reference pulse $d_r$ is reproduced with a new timing. In other words, the control pulses are reproduced with the duty cycle thereof varied.

Figure 3:
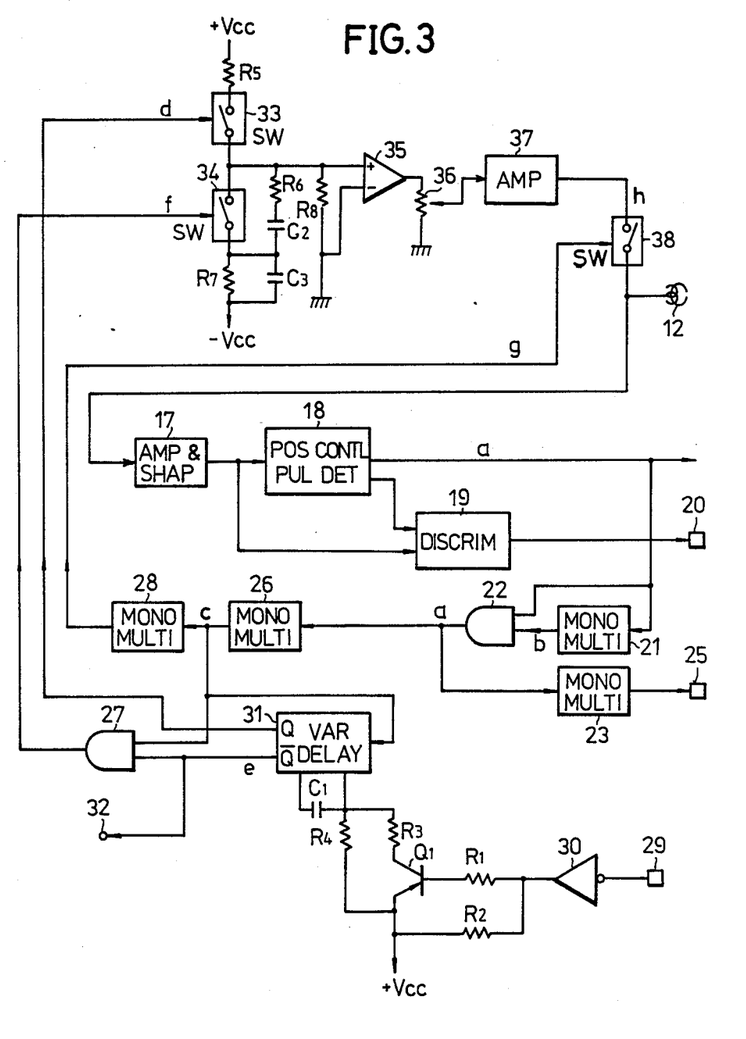
FIG. 3 is a system circuit diagram showing a first embodiment of the control pulse recording circuit according to the present invention.

The present invention relates to a control pulse recording circuit which can positively reproduce the control pulses when performing such a re-writing of the control pulse. FIG. 3 shows a first embodiment of the control pulse recording circuit according to the present invention. In FIG. 3, the control pulse to be recorded or the control pulse reproduced from the control track of the pre-recorded magnetic tape having the track pattern shown in FIG. 1 by use of the control head is passed through an amplifying and shaping circuit 17 and is supplied to a positive polarity control pulse detector 18 and a discriminating circuit 19.

Figure 5:
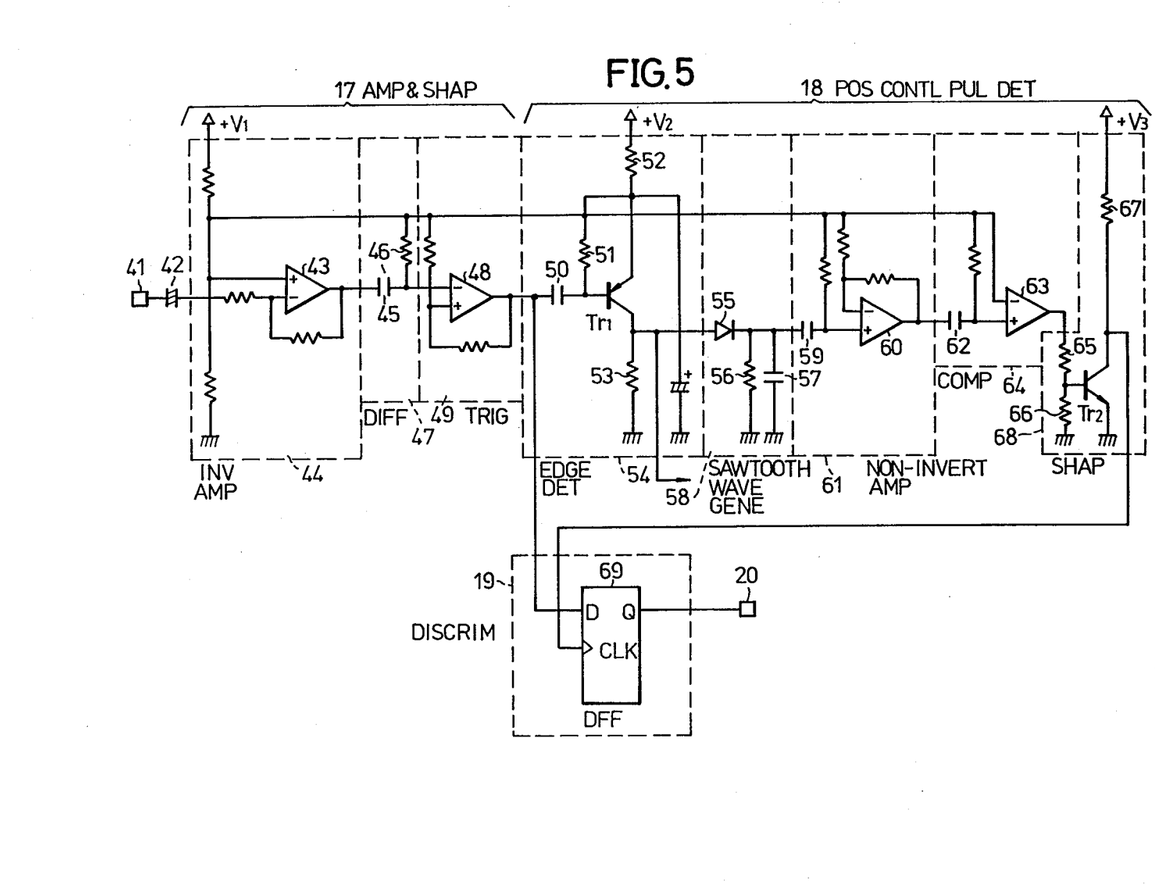
FIG. 5 is a circuit diagram showing an embodiment of an essential part of the control pulse recording circuit according to the present invention.
Figure 6:
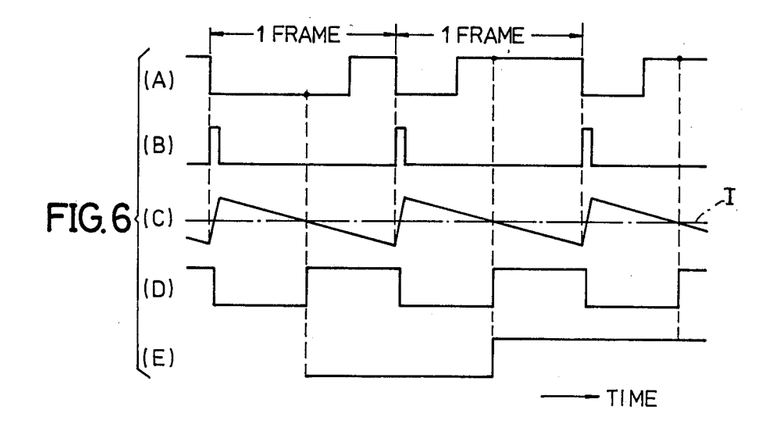

FIG. 5 shows an embodiment of a circuit part of the circuit system shown in FIG. 3 comprising the amplifying and shaping circuit 17, the positive polarity control pulse detector 18 and the discriminating circuit 19. In FIG. 5, those parts which are the same as those corresponding parts in FIG. 3 are designated by the same reference numerals. In FIG. 5, the reproduced control pulse or the control pulse to be recorded is applied to an input terminal 41. The control pulse from the input terminal 41 is passed through a coupling capacitor 42 and is supplied to an inverting amplifier 44 which comprises an operational amplifier 43 and the like. The control pulse is inverted and amplified in the inverting amplifier 44, and is supplied to a differentiating circuit 47 comprising a capacitor 45, a resistor 46 and the like. An output of the differentiating circuit 47 is supplied to a Schmitt trigger circuit 49 comprising an operational amplifier 48 and the like and is shaped into a square wave signal shown in FIG. 6 (A) which has a period of one frame.

The square wave signal from the Schmitt trigger circuit 49 has falling edges in phase synchronism with the positive polarity pulses of the reproduced control pulses from the control head 12 and rising edges in phase synchronism with the negative polarity pulses of the control pulses. Hence, the duty cycle of this square wave signal varies depending on the recorded information (data sequence of "0" and "1" in this case). The output square wave signal of the Schmitt trigger circuit 49 is passed through a capacitor 50 and is applied to the base of a PNP transistor Tr1. The capacitor 50, resistors 51 through 53, the transistor Tr1 and the like constitute an edge detecting circuit 54. In other words, a low-level signal is applied to the base of the transistor Tr1 through the capacitor 50 during a short predetermined time from a time when the input square wave signal of the edge detecting circuit 54 falls, and the transistor Tr1 is turned ON. After this short predetermined time, a high-level signal is applied to the base of the transistor Tr1 even when the input square wave signal of the edge detecting circuit 54 has a low level due to the charge in the capacitor 50, and the transistor Tr1 is turned OFF.

Accordingly, a pulse signal shown in FIG. 6 (B) which has a high level only during the time period in which the transistor Tr1 is ON is obtained from a connection point of the resistor 53 and the collector of the transistor Tr1. The pulse signal shown in FIG. 6 (B) has a constant pulse width and falls in phase synchronism with the falling edge of the output square wave signal of the Schmitt trigger circuit 49 shown in FIG. 6 (A). This pulse signal is supplied to a sawtooth wave generating circuit 58 comprising a diode 55, a discharging resistor 56 and a charging and discharging capacitor 57.

The capacitor 57 is instantly charged via the diode 55 during the high level period of the pulse signal shown in FIG. 6 (B). Since the diode 55 becomes reverse biased during the low level period of the pulse signal shown in FIG. 6 (B), the charge in the capacitor 57 is gradually discharged via the resistor 56. Hence, a sawtooth wave signal is obtained across the terminals of the capacitor 57. This sawtooth wave signal is passed through a D.C. blocking capacitor 59 and is applied to a non-inverting input terminal of an operational amplifier 60. The operational amplifier 60 and the like constitute a non-inverting amplifier circuit 61, and a sawtooth wave signal shown in FIG. 6 (C) which has been subjected to the non-inverting amplification is obtained from the non-inverting amplifier circuit 61. The output sawtooth wave signal of the non-inverting amplifier circuit 61 is passed through a D.C. blocking capacitor 62 and is applied to a non-inverting input terminal of an operational amplifier 63.

The capacitor 62, the operational amplifier 63 and the like constitute a comparator 64. The comparator 64 compares the level of the output sawtooth wave signal of the non-inverting amplifier circuit 61 and a reference voltage level indicated by a one-dot chain line I in FIG. 6 (C), and produces a square wave signal having a duty cycle of 50%. The output square wave signal of the comparator 64 is subjected to a voltage division by resistors 65 and 66 which constitute a voltage divider, and is then supplied to the base of an NPN transistor Tr2. It is possible to obtain such a symmetrical square wave signal that the phase lag with respect to the positive polarity pulses (reference pulses) of the reproduced control pulses is small and negligible, by setting the reference voltage I to a level lower than the center level of the sawtooth wave signal in FIG. 6 (C).

The resistors 65 through 67 and the transistor Tr2 constitute a shaping circuit 68. A symmetrical square wave signal shown in FIG. 6 (D) which has a duty cycle of 50% and has an inverted phase with respect to the output square wave signal of the comparator 64 is obtained from a connection point of the resistor 67 and the collector of the transistor Tr2. The symmetrical square wave signal obtained from the shaping circuit 68 has a period of one frame and is in phase synchronism with the positive polarity pulses (reference pulses) of the reproduced control pulses.

A delay type flip-flop 69 constitutes the discriminating circuit 19. The output square wave signal of the shaping circuit 68 shown in FIG. 6 (D) is supplied to a clock terminal of the flip-flop 69, and the output square wave signal of the Schmitt trigger circuit 49 shown in FIG. 6 (A) is supplied to a data terminal of the flip-flop 69. Accordingly, a pulse signal shown in FIG. 6 (E) which is obtained by sampling the square wave signal shown in FIG. 6 (A) by the rising edges of the square wave signal shown in FIG. 6 (D) is obtained from a Q-output terminal of the flip-flop 69 and is supplied to an output terminal 20.

In the case where the data recorded and reproduced on and from the control track is "0", the duty cycle of the control pulses is selected to a value smaller than 50%. On the other hand, the duty cycle of the control pulses is selected to a value larger than 50% when the data recorded and reproduced on and from the control track is "1". Hence, a discrimination signal which discriminates whether the data in the information of the control pulses (data sequence of "0" and "1") is "0" or "1" is obtained for every one frame in the discriminating circuit 19 by sampling the level information of the control pulses at a time which is approximately ½ frame after the positive polarity pulse (reference pulse) of the control pulses reproduced from the control track.

The positive polarity control pulse detector 18 is made up of the edge detecting circuit 54, the sawtooth wave generating circuit 58, the non-inverting amplifier circuit 61, the comparator 64 and the shaping circuit 68. A detection pulse signal a shown in FIGS. 4 (A) and 6 (B) obtained from the edge detecting circuit 54 within the positive polarity control pulse detector 18 is supplied to a servo circuit (not shown) and to a monostable multivibrator 21 shown in FIG. 3. The monostable multivibrator 21 is triggered by the detection pulse signal a, and a pulse signal b shown in FIG. 4 (B) which has a low level for a predetermined time from the time of the trigger is obtained from the monostable multivibrator 21.

The pulse signals a and b are supplied to an AND circuit 22 shown in FIG. 3 and a logical multiplication is performed between the two. An output signal of the AND circuit 22 is supplied to monostable multivibrators 23 and 26 and triggers the monostable multivibrators 23 and 26 by the falling edge thereof. The AND circuit 22 produces the detection pulse signal a only at a time before and after the reference pulse is reproduced when the control head 12 is surely in the reproducing mode, so as to prevent erroneous operations due to noise which may be generated in a vicinity of the negative polarity pulses of the control pulses when performing the re-writing operation.

Figure 4:
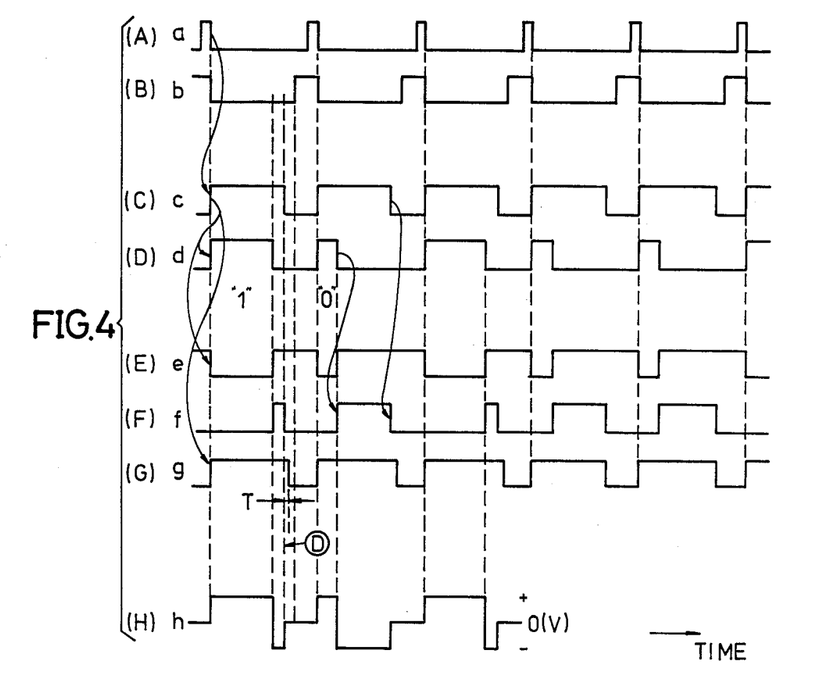

An output pulse signal of the monostable multivibrator 23 is outputted via an output terminal 25 and is supplied to a microcomputer (not shown) for controlling the operation of the VTR. On the other hand, the output pulse signal a of the AND circuit 22 is converted into a pulse signal c shown in FIG. 4 (C) in the monostable multivibrator 26. The output pulse signal c of the monostable multivibrator 26 has a pulse width corresponding to the interval between the start and end of the re-writing operation. The pulse signal c is supplied to one input terminal of a 2-input AND circuit 27, a variable delay circuit (monostable multivibrator) 31 and a monostable multivibrator 28. The monostable multivibrator 28 is triggered by the rising edge of the pulse signal c.

On the other hand, depending on the needs of the user, re-write data (information such as numbers and comments) to be used for the re-writing operation are supplied to an input terminal 29. For example, the re-write data has a low level when the data is "1" and has a high level when the data is "0". The re-write data is inverted in an inverter 30 and is supplied to the base and emitter of a PNP transistor Q1 via resistors R1 and R2, respectively. The collector and emitter of the transistor Q1 are commonly coupled to one terminal of a capacitor C1 via respective resistors R3 and R4. The variable delay circuit 31 is triggered by the rising edge of the pulse signal c and the time constant thereof is variably controlled by the transistor Q1 which is switched and controlled depending on the re-write data from the terminal 29. The time constant is determined by the capacitance and resistance of the capacitor C1 and the resistor R4 or by the capacitance and resistances of the capacitor C1 and the resistors R3 and R4. Hence, pulse signals d and e shown in FIGS. 4 (D) and 4 (E) of mutually opposite phases are produced from the variable delay circuit 31. The pulse width (duty cycle) of the pulse signals d and e varies depending on the re-write data, and the period of the pulse signals d and e is identical to the period of the reproduced control pulses. The pulse signal d is supplied to a switching circuit 33, and the pulse signal e is supplied to the other input terminal of the AND circuit 27. The pulse signal e is also supplied to an output terminal 32.

A pulse signal f shown in FIG. 4 (F) is obtained from the AND circuit 27 and is supplied to a switching circuit 34. One terminal of the switching circuit 33 and one terminal of the switching circuit 34 are coupled to a connection point of a resistor R8 and a non-inverting input terminal of an operational amplifier 35. In addition, these terminals of the switching circuits 33 and 34 are also coupled to an input terminal of a negative D.C. voltage $-V_{cc}$ via a resistor R6 and capacitors C2 and C3 which are connected in series. On the other hand, the other terminal of the switching circuit 33 is coupled to an input terminal of a positive D.C. voltage $+V_{cc}$ via a resistor R5. The other terminal of the switching circuit 34 is coupled to a connection point of the capacitors C2 and C3, and to the input terminal of the negative D.C. voltage $-V_{cc}$ via a resistor R7. The switching of the switching circuit 33 is controlled so that the switching circuit 33 is turned ON during the high level period of the pulse signal d and is turned OFF during the low level period of the pulse signal d. The switching of the switching circuit 34 is controlled so that the switching circuit 34 is turned ON during the high level period of the pulse signal f and is turned OFF during the low level period of the pulse signal f.

Accordingly, a constant positive voltage is obtained at the output of the operational amplifier 35 from the start of the re-writing operation to a certain time dependent on the re-write data when the switching circuit 33 is ON and the switching circuit 34 is OFF. On the other hand, a constant negative voltage is obtained at the output of the operational amplifier 35 from the certain time to the end of the re-writing operation when the switching circuit 33 is OFF and the switching circuit is ON. In addition, a zero voltage is obtained at the output of the operational amplifier 35 for a predetermined time after the end of the re-writing operation when the level of the next pulses of the pulse signals d and f both become low and the switching circuits 33 and 34 are both OFF. The output voltage of the operational amplifier 35 is supplied to a variable resistor 36 wherein the level is adjusted, and is thereafter supplied to a driving amplifier 37. The driving amplifier 37 supplies to a switching circuit 38 a recording voltage h shown in FIG. 4 (H).

The switching of the switching circuit 38 is controlled by an output pulse signal g of the monostable multivibrator 28. As shown in FIG. 4 (G), the pulse signal g rises in phase synchronism with the fall in the pulse signal c and falls after each fall in the pulse signals c and f and immediately before the rising edge of the pulse signal b. In other words, the pulse signal g has a pulse width narrower than the low level period of the pulse signal b and wider than the high level period of the pulse signal c. For example, the pulse signal g falls after a constant delay time T (for example, 2 msec) from the fall in the pulse signal c. The switching circuit 38 is turned ON only during the high level period of the pulse signal g. In the ON state of the switching circuit 38, the switching circuit 38 passes the recording voltage h and supplies the recording voltage h to the control head 12 so as to record the voltage on the control track. The switching circuit 38 is turned OFF during the low level period of the pulse signal g. In the OFF state of the switching circuit 38, the switching circuit 38 blocks the supply of the recording voltage h to the control head 12 so as to switch the control head 12 to the reproducing mode.

Accordingly, the control head 12 is switched to the reproducing mode after the constant delay time T from the time (indicated by ⓓ at the bottom in FIG. 4 (G)) when the re-write operation is ended and at the position immediately before the next reference pulse of the reproduced control pulses. The input recording voltage h of the control head 12 rapidly changes to zero volt at the time ⓓ when the re-writing operation is ended, however, in actual practice, the input recording voltage h is larger than zero volt and gradually converges to zero volt with time. For this reason, after the constant delay time T from the time ⓓ when the re-writing operation is ended, the input recording voltage h of the control head 12 has converged to approximately zero volt. As a result, the control head 12 is switched to the reproducing mode after the recording voltage h has converged to zero volt, and it is possible to stably reproduce the reference pulses.

According to the present embodiment, the driving impedance of the driving amplifier 37 is set to a sufficiently small value (for example, 1/50) compared to the head impedance of the control head 12. Hence, there is no undesirable effect of the exciting current and the like even when the driving amplifier 37 and the control head are constantly coupled to each other. However, in this case, a current drift and a decrease in the reproduced output are introduced at the time of the reproduction, and it becomes difficult to perform the necessary adjustments. Further, it becomes necessary to provide further amplification range of approximately 30 dB in the driving amplifier 37. The undesirable effect of the exciting current can also be eliminated effectively by coupling a highpass filter at the input of the amplifying and shaping circuit 17 so as to prevent the D.C. saturation of the amplifying and shaping circuit 17.

Figure 7:
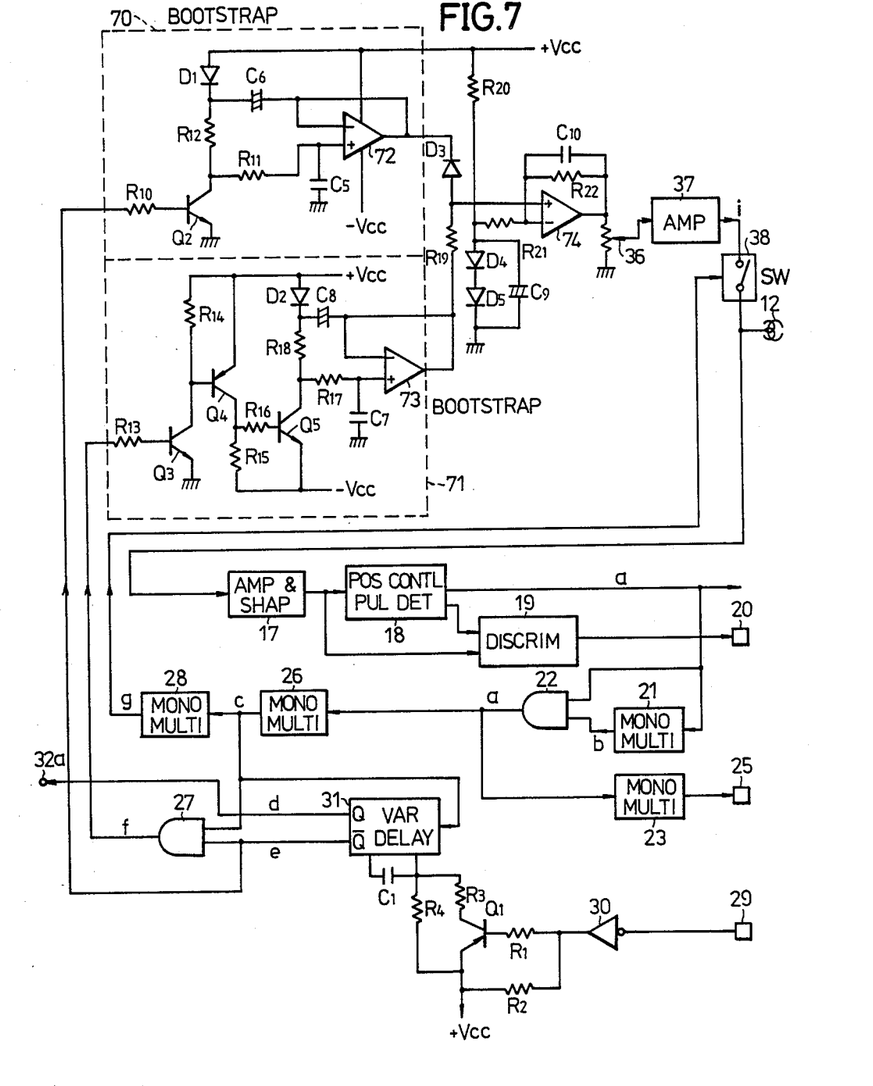
FIG. 7 is a system circuit diagram showing a second embodiment of the control pulse recording circuit according to the present invention.

Next, description will be given with respect to a second embodiment of the control pulse recording circuit according to the present invention. FIG. 7 shows the second embodiment. In FIG. 7, those parts which are the same as those corresponding parts in FIG. 3 are designated by the same reference numerals, and description thereof will be omitted. In addition, the signal waveforms shown in FIGS. 8 (A) through 8 (G) are identical to those shown in FIGS. 4 (A) through 4 (G), respectively.

Figure 8:
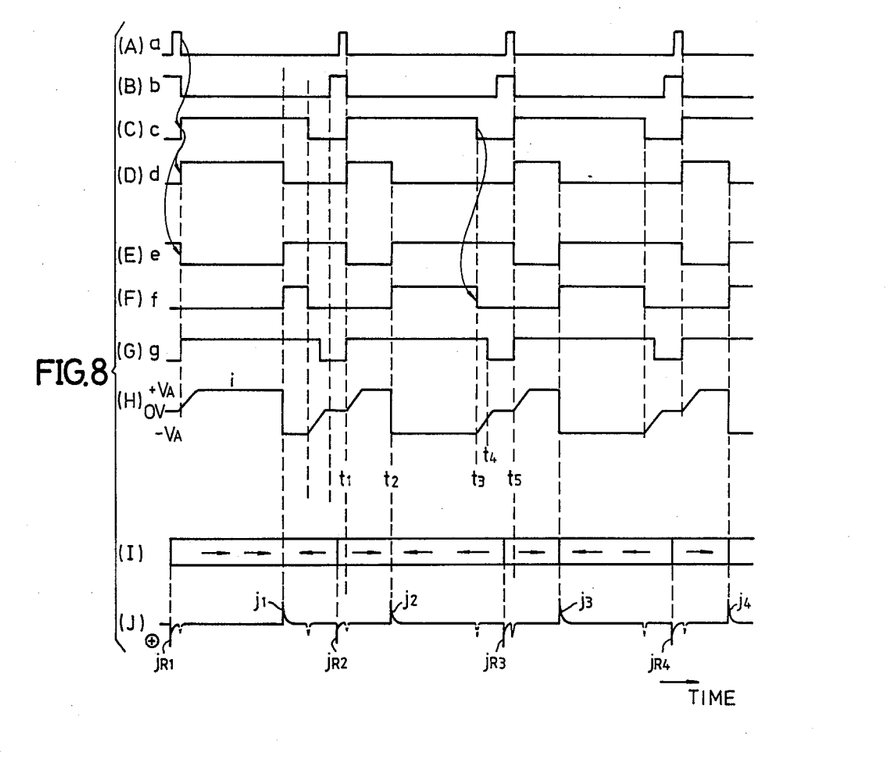

In FIG. 7, the output pulse signal d of the variable delay circuit 31 shown in FIG. 8 (D) is supplied to an output terminal 32a. The output pulse signal e of the variable delay circuit 31 shown in FIG. 8 (E) is supplied to the other input terminal of the AND circuit 27. Further, the pulse signal e is supplied to the base of an NPN transistor Q2 within a first bootstrap circuit 70 via a resistor R10. The pulse signal f shown in FIG. 8 (F) is obtained from the AND circuit 27 and is supplied to the base of an NPN transistor Q3 within a second bootstrap circuit 71 via a resistor R13.

The first bootstrap circuit 70 comprises resistors R10 through R12, capacitors C5 and C6, the transistor Q2, a diode D1 and an operational amplifier 72. During the high level period of the pulse signal e, the transistor Q2 is turned ON, an output voltage of the operational amplifier 72 is zero volt, and the diode D1 is ON so as to supply a current to the capacitor C6 and charge the capacitor C6. In this state, when the level of the pulse signal e becomes low, the transistor Q2 is turned OFF, and the capacitor C5 starts to become charged via the resistors R12 and R11. Furthermore, the cathode potential of the diode D1 increases and the diode D1 becomes reverse biased. Hence, the terminal voltage of the capacitor C5 is passed through the operational amplifier 72 which constitutes a voltage follower and is supplied to the capacitor C6.

Accordingly, the capacitor C5 is charged by a constant current, and the output voltage of the operational amplifier 72 gradually increases to the power source voltage +Vcc with a good linearity in accordance with the charging time constant of the capacitor C5. The output voltage of the operational amplifier 72 is held to the power source voltage +Vcc after the power source voltage +Vcc is reached. In this state, when the level of the pulse signal e becomes high, the transistor Q2 and the diode D1 are turned ON, and the charge in the capacitor C5 is instantly discharged via the resistor R11 and the transistor Q2. Hence, the output voltage of the operational amplifier 72 becomes zero volt instantly.

The second bootstrap circuit 71 comprises resistors R13 through R18, capacitors C7 and C8, NPN transistors Q3 and Q5, a PNP transistor Q4, a diode D2 for improving the linearity, and an operational amplifier 73. During the high level period of the pulse signal f, the transistors Q3 through Q5 are turned ON, and an output voltage of the operational amplifier 73 becomes +Vcc. In this state, when the level of the pulse signal f becomes low, the transistors Q3 through Q5 are turned OFF, and the capacitor C7 starts to become charged by the power source voltage +Vcc. Thus, the output voltage of the operational amplifier 73 gradually increases toward +Vcc in accordance with the charging time constant of the capacitor C7. The output voltage of the operational amplifier 73 is held to +Vcc after the power source voltage +Vcc is reached. In addition, when the level of the pulse signal f becomes high in this state, the output voltage of the operational amplifier 73 immediately becomes −Vcc.

The output of the operational amplifier 72 is coupled to the cathode of a diode D3, and the output of the operational amplifier 73 is coupled to the anode of the diode D3 via a resistor R17. Accordingly, out of the output voltages of the operational amplifiers 72 and 73, the smaller output voltage (a voltage having the same waveform as that shown in FIG. 8 (H) which will be described later) is obtained at the anode of the diode D3. This output voltage obtained at the anode of the diode D3 is subjected to a non-inverting amplification in an operational amplifier 74, and the level is thereafter adjusted in the variable resistor 36. The signal from the variable resistor 36 is passed through the driving amplifier 37 and is formed into a recording voltage i shown in FIG. 8 (H), and the recording voltage i is supplied to the switching circuit 38. A reference voltage obtained from resistors R20 and R21, diodes D4 and D5, a capacitor C9 and the D.C. voltage +Vcc is supplied to an inverting input terminal of the operational amplifier 74. A parallel circuit comprising a capacitor C10 and a resistor R22 connected in parallel is coupled between the output and the inverting input terminal of the operational amplifier 74.

As described before, the switching circuit 38 is turned ON only during the high level period of the pulse signal g. In the ON state of the switching circuit 38, the switching circuit 38 passes the recording voltage i and supplies the recording voltage i to the control head 12 so as to record the voltage on the control track. Accordingly, when the level of the pulse signal g becomes high at a time t1 in FIG. 8, for example, the recording voltage i gradually increases toward a voltage $+V_A$. In addition, the control head 12 is excited to the N-pole until a time t2, for example, and is excited to the S-pole during a time period from the time t2 until a time t3 when the level of the pulse signal c becomes low while the recording voltage i is $-V_A$. The level of the pulse signal g becomes low at a time t4 which is a predetermined time after the time t3. During the low level period of the pulse signal g between the time t4 and a time t5, the switching circuit 38 is in the OFF state, and the supply of the recording voltage i to the control head 12 is blocked. For this reason, the control head 12 reproduces the pre-recorded control pulses from the control track.

Therefore, according to the present embodiment, the direction of the magnetic field on the control track after the re-writing operation is performed becomes as shown schematically in FIG. 8 (I). Hence, the waveform of the reproduced control pulses after the re-writing operation is performed becomes as indicated by a solid line in FIG. 8 (J). Reference pulses $j_{R1}$ through $j_{R4}$ are reproduced with a constant period, and negative polarity pulses $j_1$ through $j_4$ after the respective reference pulses $j_{R1}$ through $j_{R4}$ are reproduced with a new timing which is in accordance with the re-write data.

Conventionally, the recording voltage varies rapidly at the position Ⓐ where the re-writing operation is started and at the position Ⓓ where the re-writing operation is ended as shown in FIG. 2 (C). For this reason, noise n1 and n2 is often generated in the waveform of the reproduced control pulses as shown in FIG. 2 (D). The position of the noise n1 and n2 is indicated by phantom lines in FIG. 8 (J).

However, according to the present embodiment, the recording voltage i at the times t1 and t5 when the re-writing operation is started increases with a slope. Furthermore, the recording voltage i at the time t3 when the re-writing operation is ended also increases with a slope. Hence, the generation of the noise described above is reduced to such an extent that it is negligible from the practical point of view.

The noise varies due to factors such as the saturation level of the magnetic tape, impedance of the control head, the value of the counter electromotive force and the gap width of the control head. For this reason, the bootstrap circuits 70 and 71 are employed so as to obtain a trapezoidal recording voltage having sloping portions of good linearity. However, other circuits may be employed as long as it is possible to obtain a trapezoidal recording voltage having sloping portions of good linearity.

Further, the present invention is not limited to these embodiments, but various variations and modifications may be made without departing from the scope of the present invention.

What is claimed is:

1. A control pulse recording circuit for a magnetic recording and reproducing apparatus, said control pulse recording circuit comprising:

a control head for reproducing at least leading edges of square wave control pulses from a control track of a pre-recorded magnetic tape which is pre-recorded with the control pulses with a constant period, and for recording a recording voltage which is to be recorded and is supplied thereto so as to re-write positions of trailing edges of said control pulses within an interval between two mutually adjacent leading edges of the pre-recorded control pulses on the pre-recorded magnetic tape so that a duty cycle of the control pulses becomes a value in accordance with a value of recording data to be recorded by a re-writing operation, said leading edges of the control pulses reproduced by said control head being used in a servo circuit within the magnetic recording and reproducing apparatus;

detecting means for detecting the leading edges of the control pulses reproduced by said control head and for producing a detection pulse signal;

recording voltage generating means supplied with the output detection pulse signal of said detecting means and said recording data for generating a recording voltage having three levels including a zero level, a polarity of said recording voltage changing across said zero level at a time in accordance with said recording data in an interval from a starting time when the re-writing operation is started between the two mutually adjacent leading edges of the pre-recorded control pulses to an ending time when the re-writing operation is ended; and switching means for selectively supplying said recording voltage from said recording voltage generating means to said control head during said interval from the starting time to the ending time so as to switch a mode of said control head into a recording mode, and for blocking the supply of said recording voltage to said control head at a time which is after a predetermined time from the ending time where said recording voltage becomes approximately said zero level, and is immediately before a next leading edge of the control pulses so as to switch the mode of said control head into a reproducing mode.

2. A control pulse recording circuit as claimed in claim 1 in which said recording voltage generating means generates a recording voltage having a sloping portion at each of a vicinity of the starting time and a vicinity of the ending time.

3. A control pulse recording circuit as claimed in claim 1 in which said detecting means comprises a differentiating circuit for differentiating the control pulses reproduced by said control head, a Schmitt trigger circuit for converting an output signal of said differentiating circuit into a square wave signal, an edge detecting circuit supplied with the output square wave signal of said Schmitt trigger circuit for detecting edges of said square wave signal corresponding to the leading edges of the control pulses and for producing a detection signal, and a circuit for producing from the output detection signal of said edge detecting circuit an approximately symmetrical square wave signal in phase synchronism with said detection pulse signal.

4. A control pulse recording circuit as claimed in claim 1 in which said recording voltage generating means comprises a first pulse generating circuit for generating a first pulse signal having a pulse width corresponding to the interval between said starting and ending times based on the output detection pulse signal of said detecting means, a second pulse generating circuit supplied with said recording data and said first pulse signal from said first pulse generating circuit for generating a second pulse signal having the same period as said first pulse signal and having a pulse width in accordance with said recording data, a gate circuit supplied with said first and second pulse signals for generating a third pulse signal having a pulse width corresponding to an interval between a trailing edge of said second pulse signal and said ending time, and a circuit supplied with said second and third pulse signals for generating said recording voltage.

5. A control pulse recording circuit for a magnetic recording and reproducing apparatus, said control pulse recording circuit comprising:
a control head for reproducing at least leading edges of square wave control pulses from a control track of a pre-recorded magnetic tape which is pre-recorded with the control pulses with a constant period, and for recording a recording voltage which is to be recorded and is supplied thereto so as to re-write positions of trailing edges of said control pulses within an interval between two mutually adjacent leading edges of the pre-recorded control pulses on the pre-recorded magnetic tape so that a duty cycle of the control pulses becomes a value in accordance with a value of recording data to be recorded by a re-writing operation, said leading edges of the control pulses reproduced by said control head being used in a servo circuit within the magnetic recording and reproducing apparatus;
detecting means for detecting the leading edges of the control pulses reproduced by said control head and for producing a detection pulse signal;
recording voltage generating means supplied with the output detection pulse signal of said detecting means and said recording data for generating a recording voltage having a polarity which changes at a time in accordance with said recording data in an interval from a starting time when the re-writing operation is started between the two mutually adjacent leading edges of the pre-recorded control pulses to an ending time when the re-writing operation is ended;
switching means for selectively supplying said recording voltage from said recording voltage generating means to said control head during said interval from the starting time to the ending time so as to switch a mode of said control head into a recording mode, and for blocking the supply of said recording voltage to said control head at a time which is after a predetermined time from the ending time and is immediately before a next leading edge of the control pulses so as to switch the mode of said control head into a reproducing mode; and
a discriminating circuit supplied with first and second square wave signals from said detecting means for producing a discrimination signal by sampling said second square wave signal by trailing edges of said first square wave signal, said first square wave signal being an approximately symmetrical square wave signal having trailing edges corresponding to the leading edges of the control pulses and having the same period as the control pulses, said second square wave signal being shaped control pulses from said control head.

6. A control pulse recording circuit for a magnetic recording and reproducing apparatus, said control pulse recording circuit comprising:
a control head for reproducing at least leading edges of square wave control pulses from a control track of a pre-recorded magnetic tape which is pre-recorded with the control pulses with a constant period, and for recording a recording voltage which is to be recorded and is supplied thereto so as to re-write positions of trailing edges of said control pulses within an interval between two mutually adjacent leading edges of the pre-recorded control pulses on the pre-recorded magnetic tape so that a duty cycle of the control pulses becomes a value in accordance with a value of recording data to be recorded by a re-writing operation, said leading edges of the control pulses reproduced by said control head being used in a servo circuit within the magnetic recording and reproducing apparatus;
detecting means for detecting the leading edges of the control pulses reproduced by said control head and for producing a detection pulse signal;
recording voltage generating means supplied with the output detection pulse signal of said detecting means and said recording data for generating a recording voltage having a polarity which changes at a time in accordance with said recording data in an interval from a starting time when the re-writing operation is started between the two mutually adjacent leading edges of the pre-recorded control pulses to an ending time when the re-writing operation is ended;
switching means for selectively supplying said recording voltage from said recording voltage generating means to said control head during said interval from the starting time to the ending time so as to switch a mode of said control head into a recording mode, and for blocking the supply of said recording voltage to said control head at a time which is after a predetermined time from the ending time and is immediately before a next leading edge of the control pulses so as to switch the mode of said control head into a reproducing mode, said recording voltage generating means comprising a first bootstrap circuit for generating a first trapezoidal wave signal which rises to a positive power source voltage with a constant slope during a time period from said starting time to the time when the polarity of said recording voltage changes and is thereafter held to said positive power source voltage but is zero in other time periods, a second bootstrap circuit for generating a second trapezoidal wave signal which rises from a negative power source voltage to said positive power source voltage with a constant slope during a time period from said ending time to a next starting time and is thereafter held to said positive power source voltage but is held to said negative power source voltage in other time periods, and a circuit for producing one of the output trapezoidal wave signals of said first and second bootstrap circuits having a smaller level so as to generate a recording voltage having a sloping portion at each of a vicinity of the starting time and a vicinity of the ending time.

* * * * *